Figure 1:
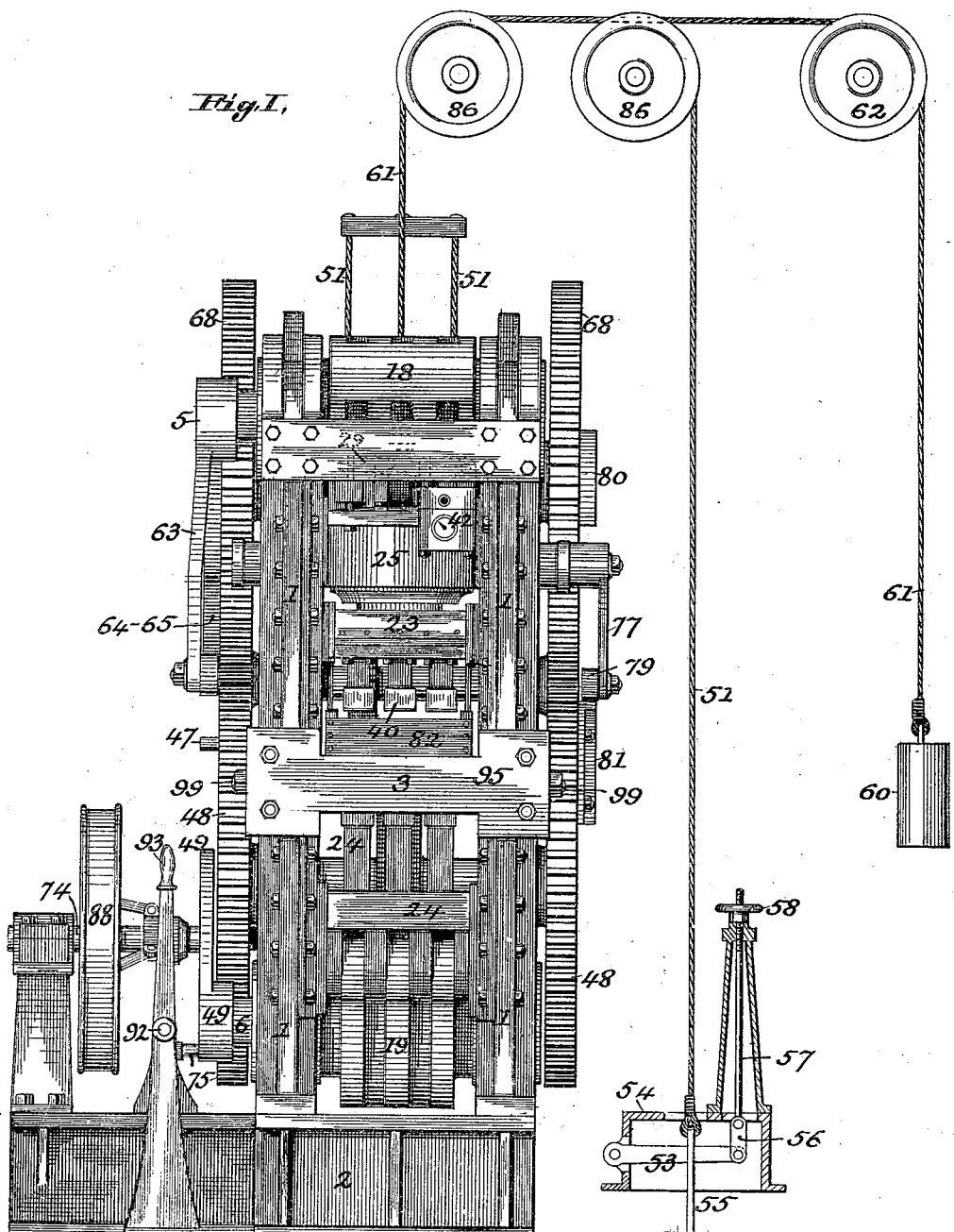

No. 663,606. Patented Dec. 11, 1900.
J. J. KOCH.
BRICK PRESS.
(Application filed Mar. 21, 1891.)
(No Model.) 8 Sheets—Sheet 3.

Witnesses:
Geo H Arthur
M. H. Holmes.

Inventor:
J. J. Koch,
by Robert Burns
Attorney.

No. 663,606. Patented Dec. 11, 1900.
J. J. KOCH.
BRICK PRESS.
(Application filed Mar. 21, 1891.)
(No Model.) 8 Sheets—Sheet 4.
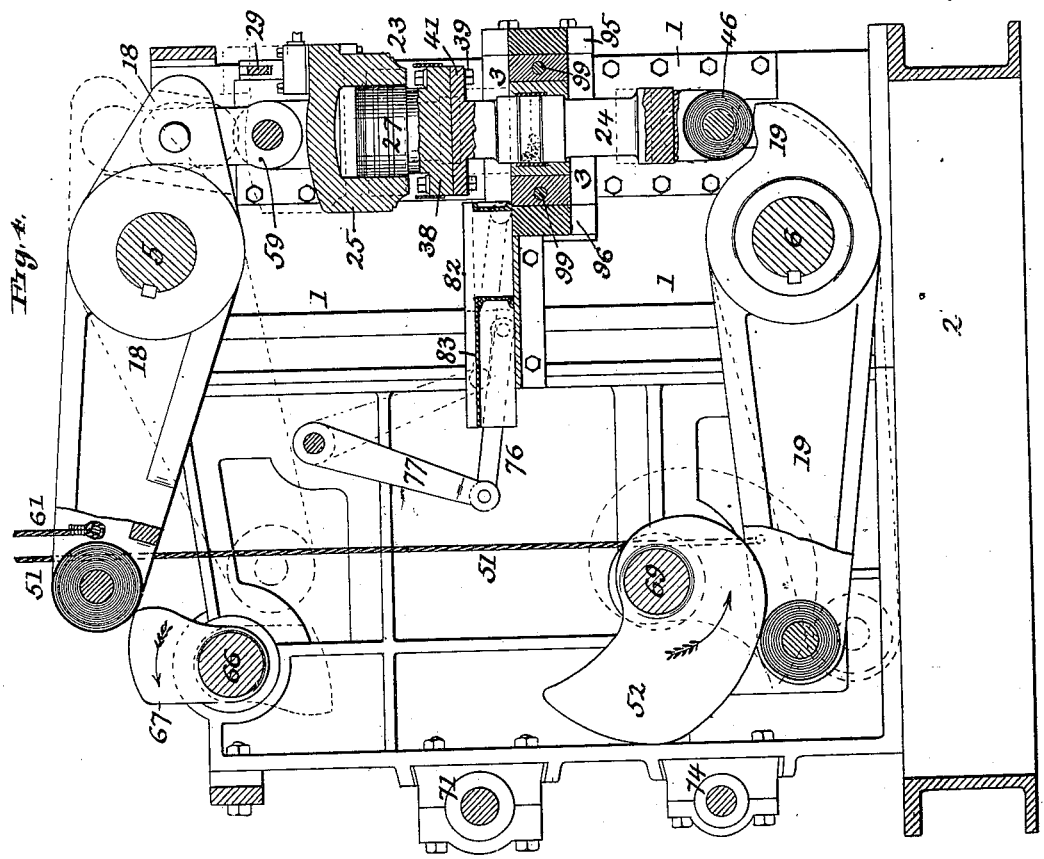
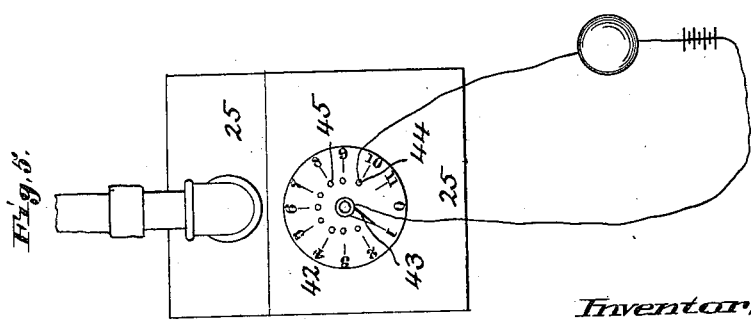
Witnesses:
Geo. H. Arthur
M. H. Holmes
Inventor:
J. J. Koch,
by Robert Burns
Attorney.

No. 663,606. Patented Dec. 11, 1900.
J. J. KOCH.
BRICK PRESS.
(Application filed Mar. 21, 1891.)
(No Model.) 8 Sheets—Sheet 5.
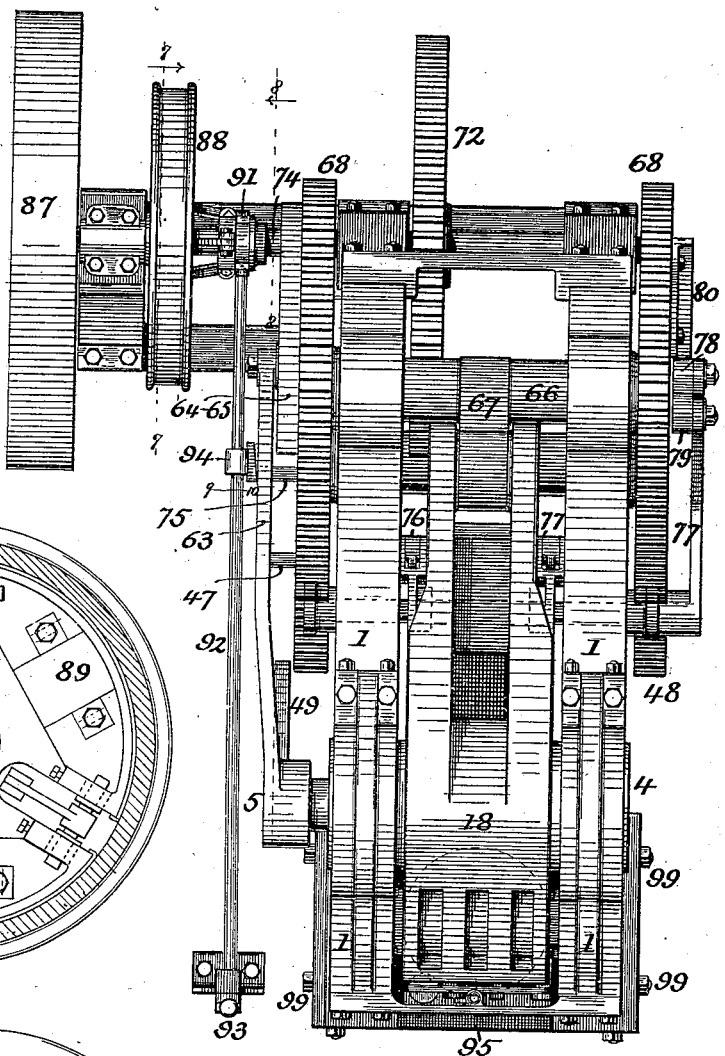
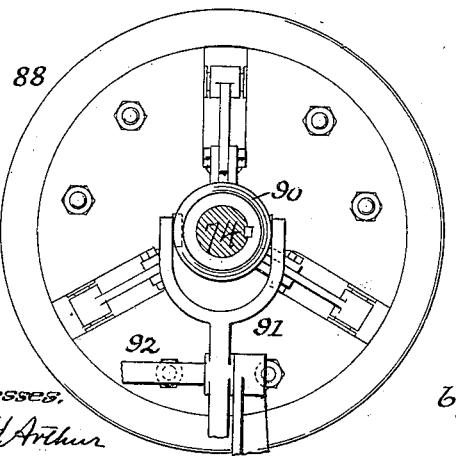
Witnesses,
Geo H Arthur
M. H. Holmes
Inventor;
J. J. Koch,
by Robert Burns
Attorney No. 663,606. Patented Dec. 11, 1900.
J. J. KOCH.
BRICK PRESS.
(Application filed Mar. 21, 1891.)
(No Model.) 8 Sheets—Sheet 6.
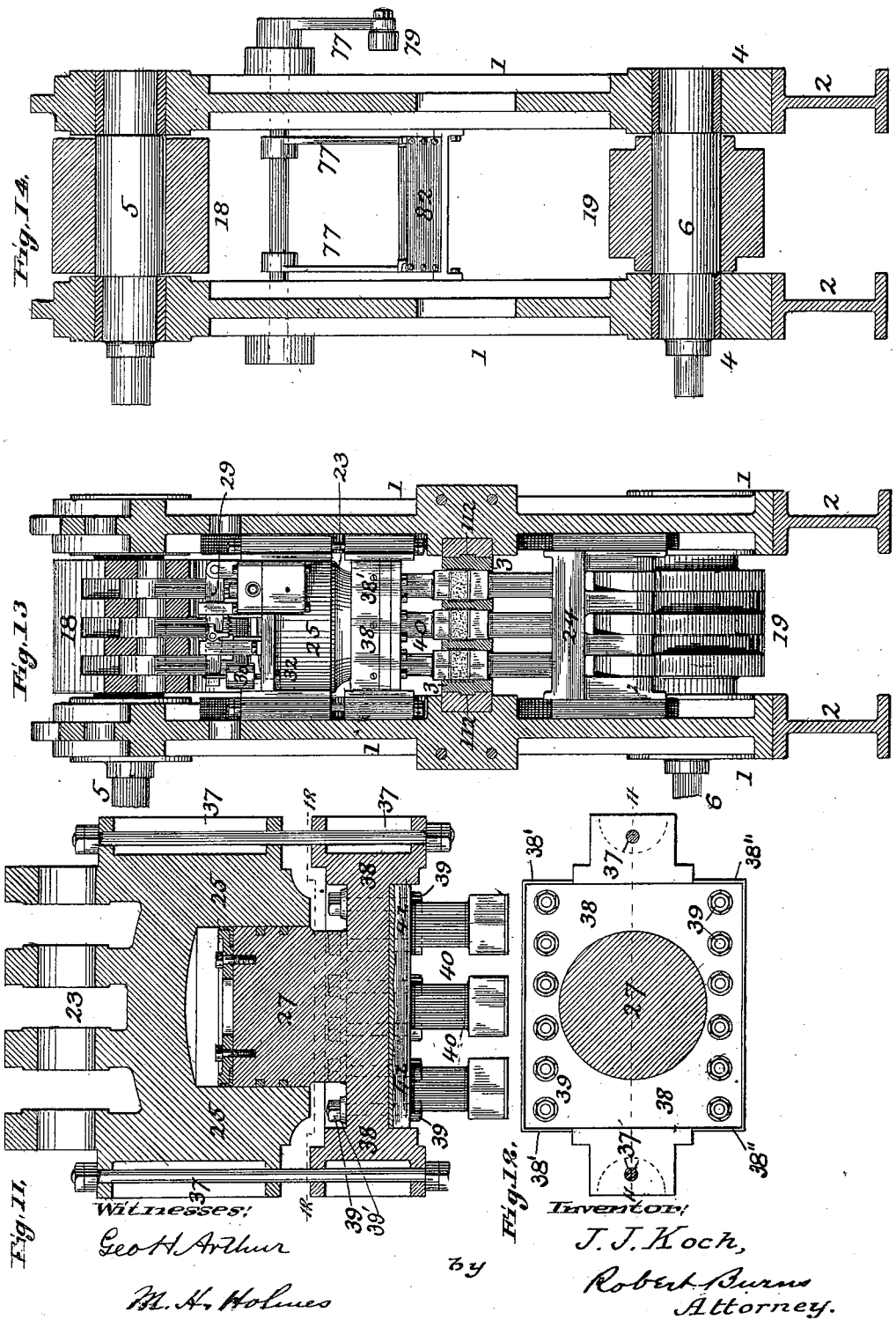
Witnesses: Inventor:
Geo H Arthur J. J. Koch,
M. H. Holmes by Robert Burns
Attorney.

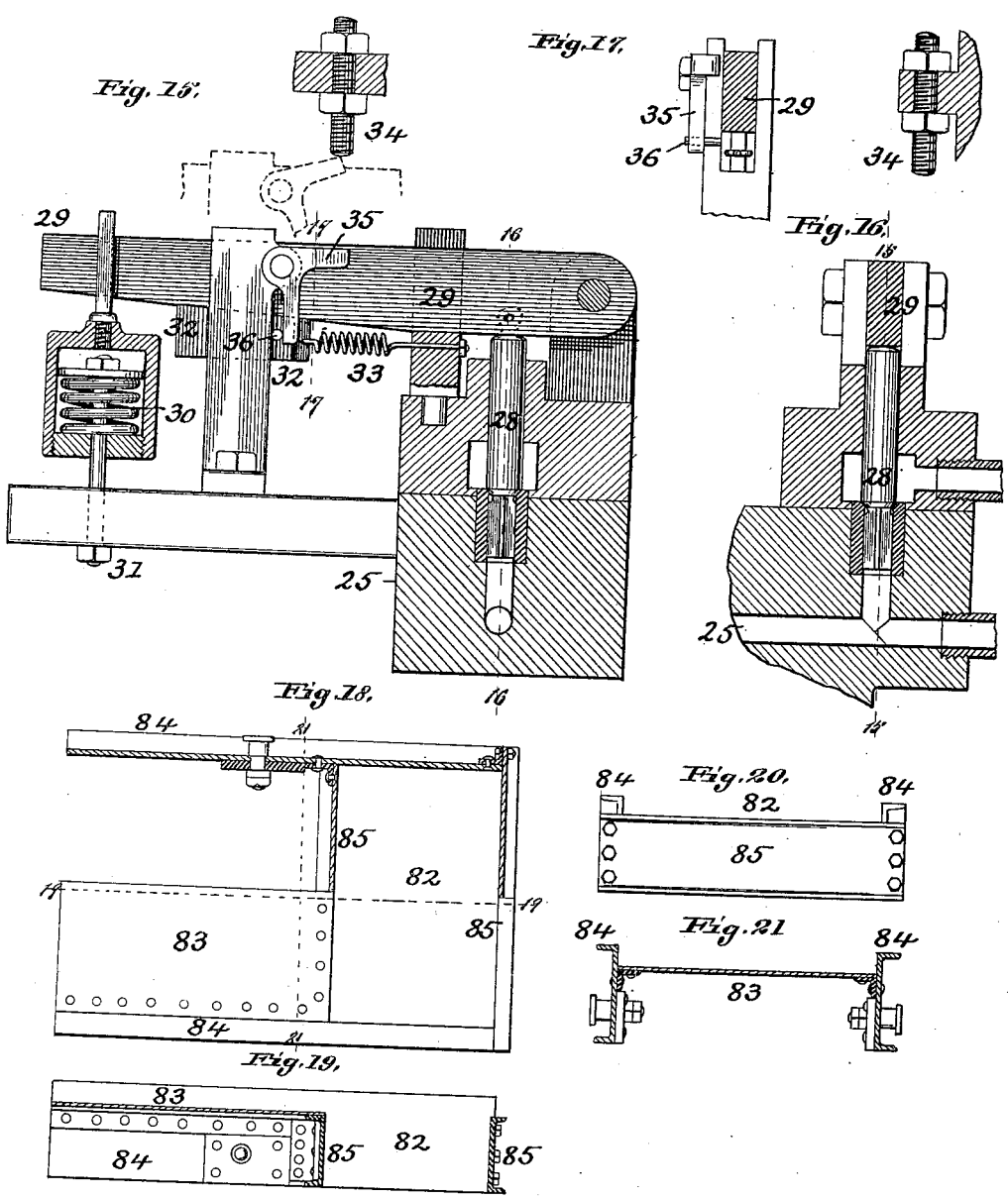

No. 663,606. Patented Dec. 11, 1900.
J. J. KOCH.
BRICK PRESS.
(Application filed Mar. 21, 1891.)
(No Model.) 8 Sheets—Sheet 8.
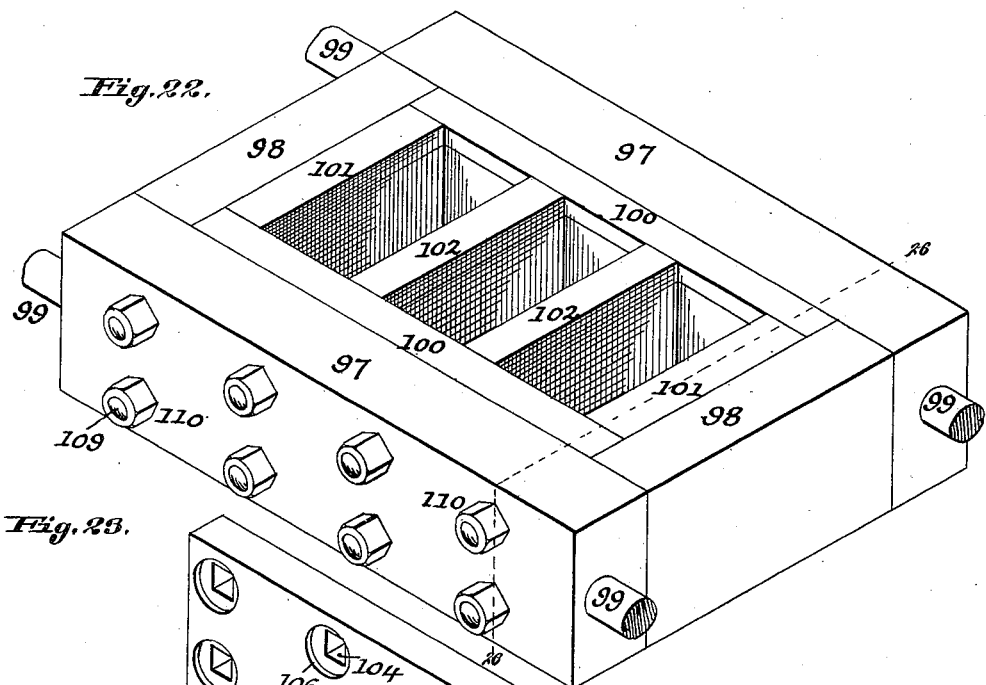
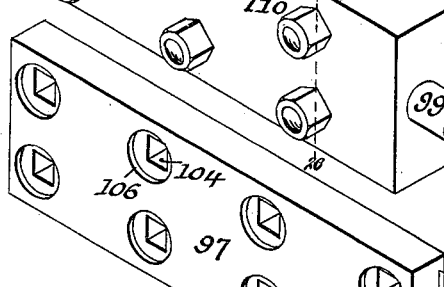
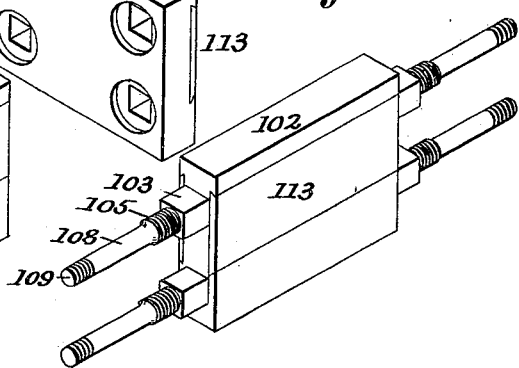
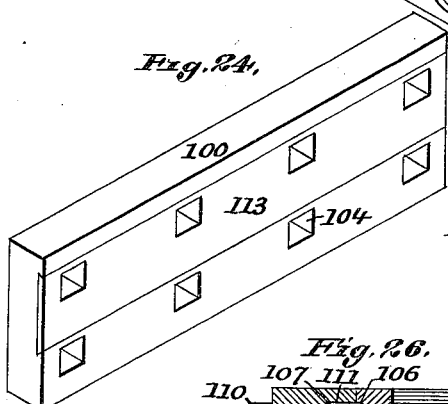
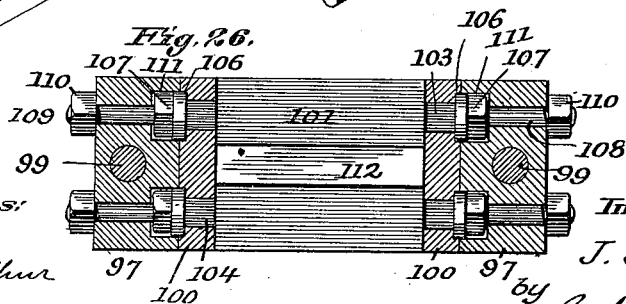
Witnesses:
Geo. H. Arthur
M. H. Holmes
Inventor:
J. J. Koch;
by Robert Burns
Attorney.

UNITED STATES PATENT OFFICE.

JULIUS J. KOCH, OF ST. LOUIS, MISSOURI.

BRICK-PRESS.

SPECIFICATION forming part of Letters Patent No. 663,606, dated December 11, 1900.

Application filed March 21, 1891. Serial No. 385,925. (No model.)

*To all whom it may concern:*

Be it known that I, JULIUS J. KOCH, a citizen of the United States, residing at St. Louis, in the State of Missouri, have invented certain new and useful Improvements in Brick-Presses; and I do hereby declare the following to be a full, clear, and exact description of the invention, such as will enable others skilled in the art to which it appertains to make and use the same.

My present invention relates to improvements in brick-presses of the pressure or dry-clay class, and more particularly to such as are described in my former Letters Patent, No. 340,049, of April 13, 1886.

Various objects of my invention are as follows: first, to provide the hydraulic safety connection or cushion that in my aforesaid patent is interposed between the pressure-receiving portion and the pressure-imparting portion or head of the mold-plungers and is adapted to yield to a predetermined pressure, with means for adjusting the amount of movement of the plunger parts with relation to each other, so as to time the pressure on the charge of clay to accord with the thickness of the brick or block produced; second, to provide in connection with said hydraulic safety connection an automatic means for locking the weighted or loaded safety or relief valve of the same in an open condition as it is forced open by an excess of resistance in the clay and retain said open condition of the valve until in the upward movement of the plunger and its consequent extension the water is drawn back into the hydraulic cylinder, after which, and before the plunger begins to redescend, the valve and its pressure, affording mechanism is released to close the hydraulic cylinder and resecure the plunger parts in their normal extended condition; third, to provide in connection with said hydraulic safety connection means for indicating the amount of pressure attained on the charge of clay and at the same time give a constantly-recurring series of alarms during the proper working of the machine; fourth, to provide a sectional mold construction adapted for ready removal and detachment, so that the parts can be easily replaced and substituted in changing the mold from one style or form of brick to another; fifth, to afford a simple and effective means for automatically stopping the press at any desired point, usually after the brick-pressing operation, so as to require the operator to restart the press after each pressing of brick and which is capable of ready change to permit of the action of the press being continuous in its operation; sixth, to provide means for imparting a positive initial downward movement to the lower mold-plunger, so as to insure its descent in proper time to admit of the mold receiving its supply of clay; seventh, to provide a simple and effective construction whereby the mold heads or plungers proper are secured to the main body of the plunger in a ready and substantial manner; eighth, to provide a simple and effective mechanism to regulate the descent of the lower plunger in the mold and so gage the amount of clay received by the same, and, ninth, to provide an improved construction for the charger of the press embodying the features of lightness, strength, and durability, combined with readiness of repair in case of an accidental breakage of any part thereof. I attain such objects by the construction and arrangement of parts illustrated in the accompanying drawings, in which—

Figure 2:
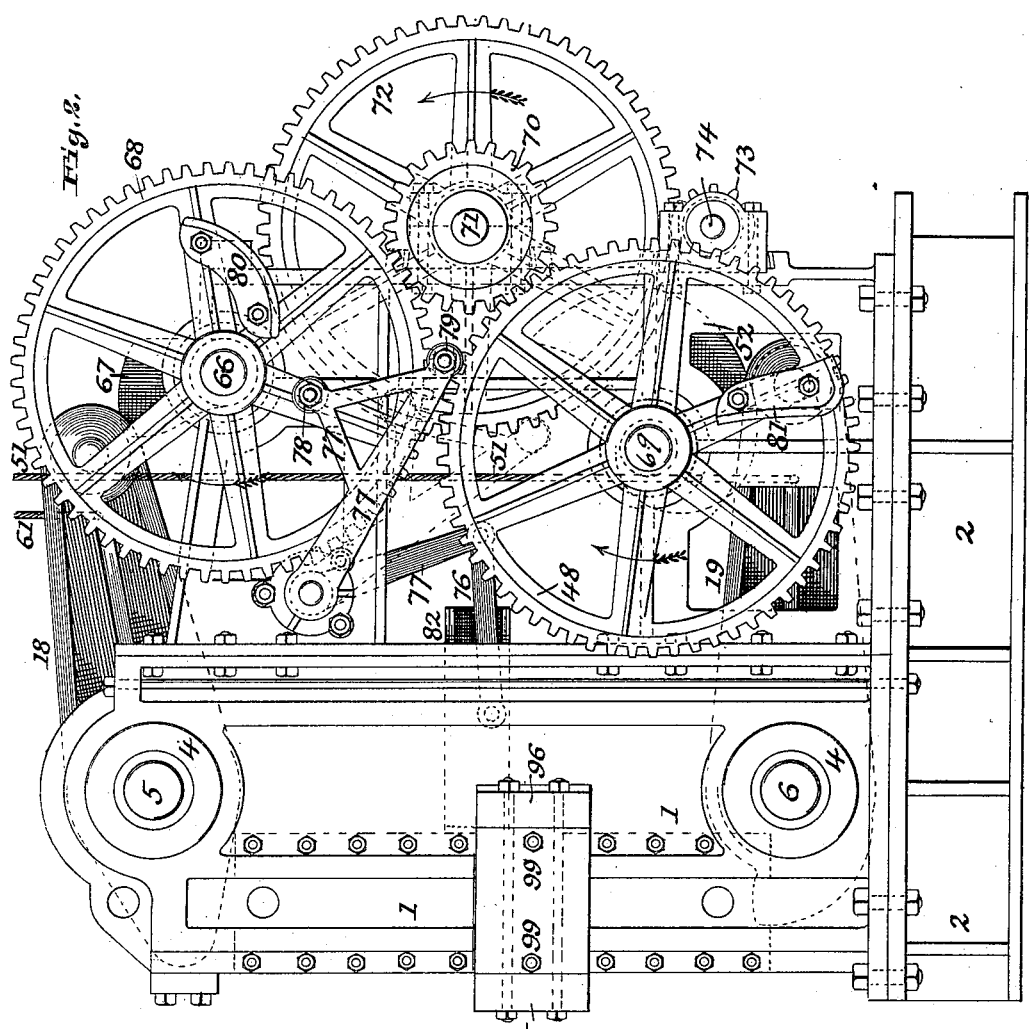
Figure 3:
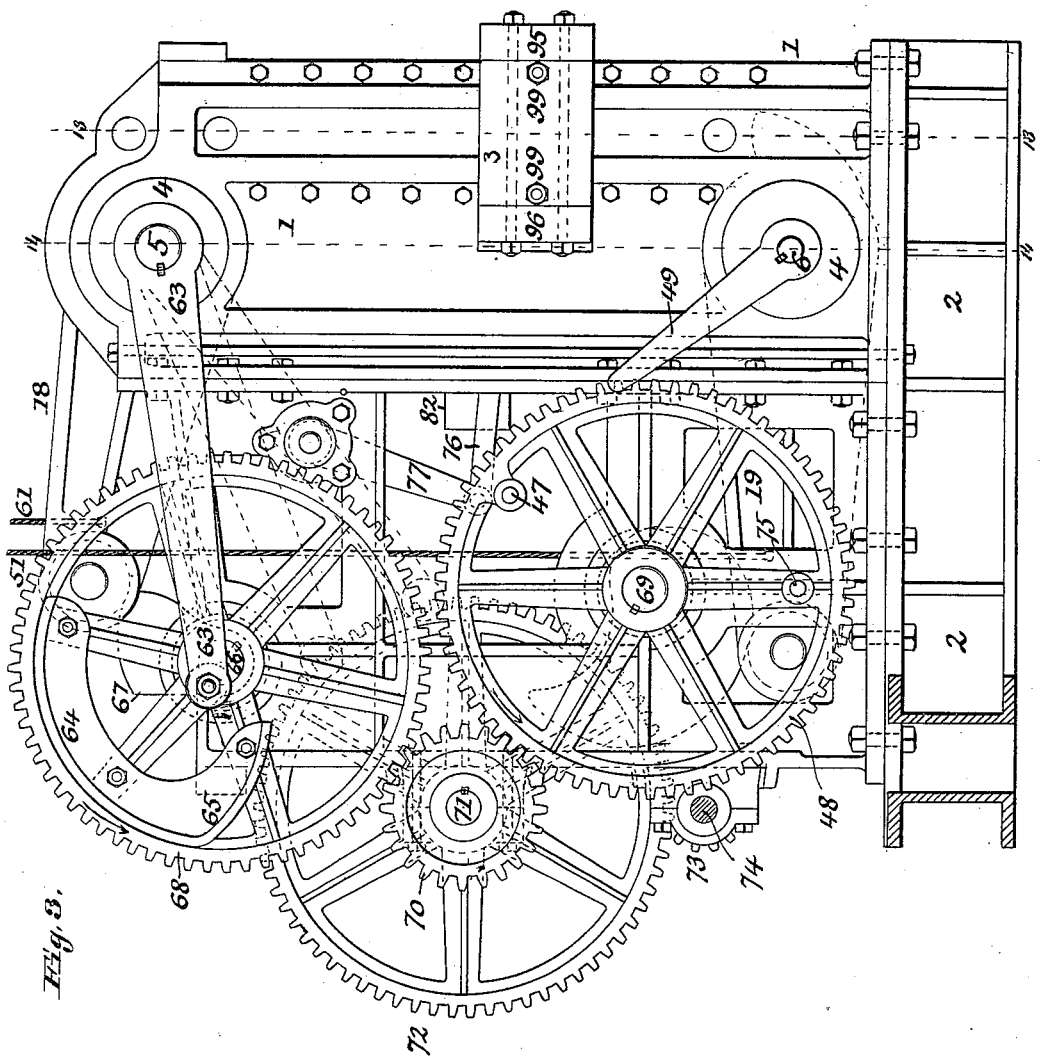

Figure 1 is a front elevation of a brick-press to which my present improvements are applied; Figs. 2 and 3, side elevations from opposite sides of the press; Fig. 4, a longitudinal sectional elevation; Fig. 5, a detail front elevation of the pressure-indicator and alarm device at the front of the press; Fig. 6, a top plan of the press; Fig. 7, a detail section at line 7 7, Fig. 6, of the friction-clutch on the main driving-shaft of the press; Fig. 8, a similar view at line 8 8, Fig. 6; Figs. 9 and 10, enlarged detail sectional views at lines 9 10, Fig. 6, illustrating the two positions of the automatic mechanism for operating the friction or driving clutch of the press; Fig. 11, an enlarged transverse section at line 11 11, Fig. 12 of the upper mold-plunger and its parts; Fig. 12, a horizontal section of the same at line 12 12, Fig. 11; Fig. 13, a transverse section of the press at line 13 13, Fig. 3; Fig. 14, a similar view at line 14 14, Fig. 3; Fig. 15, an enlarged detail transverse sectional elevation at line 15 15, Fig. 16, of the safety or relief valve mechanism of the hydraulic cylinder; Fig. 16, an enlarged detail longitudinal section of the same at line 16 16, Fig. 15; Fig. 17, a similar view at line 17 17, Fig. 15; Fig. 18, a detail view of the charger, one-half in plan view and one-half in horizontal section; Fig. 19, a longitudinal section of the charger at line 19 19, Fig. 18; Fig. 20, a front elevation of the same; Fig. 21, a transverse section of the same at line 21 21, Fig. 18; Fig. 22, an isometric perspective view of the mold detached from the machine; Figs. 23 and 24, similar views of opposite sides of one of the side liners of the mold; Fig. 25, a similar view of one of the cross-liners of the mold; Fig. 26, a detail longitudinal section of the mold at line 26 26, Fig. 22.

Similar numerals of reference indicate like parts in the different views.

Referring to the drawings, 1 1 represent the main or lateral housings of the press, resting on and suitably attached to the main base or bed 2. The housings, midway of their height, support the stationary brick-mold 3 and at top and bottom are provided with journal bearings or boxes 4 for the respective trunnions 5 and 6 of the main upper and lower pressure-levers 18 and 19 of the upper and lower mold-plungers 23 and 24, arranged to move vertically in suitable guides on the inner faces of the housings 1 1.

As in my former patent, No. 340,049, one of the mold-plungers is so constructed as to yield or contract upon itself when a predetermined pressure or force is exerted upon the charge of clay in the molds, thus preventing the occurrence of an undue or excessive resistance to a further or continued movement of the pressure-imparting mechanism and in consequence avoiding the liability to breakage of parts due to an excessive resistance of the clay. In the present improvement preference is given to the upper mold-plunger as the part to which to apply the present safety appliances, yet it is within the scope of my present invention to adapt such appliances to any other pressure-imparting portion of the press.

In the construction illustrated in the drawings the upper mold-plunger 23 is formed in two parts with an interposed water cushion between, the upper part being formed with a hydraulic cylinder 25 and the lower with a head or plunger 27 therefor, as in my former patent.

In the present construction the safety or relief valve 28, Fig. 15, for the hydraulic cushion is held to its seat by the valve-lever 29, pivoted to the hydraulic cylinder, the longer arm of the lever being drawn downward to hold said valve in its closed condition by a strong spring 30, also attached to the hydraulic cylinder, the tension of which is capable of adjustment by an adjusting-bolt 31 to suit the required resistance that must be overcome before the valve will open to afford relief. Said valve as it is forced upward by an excess of pressure in the hydraulic cylinder is automatically secured against a return movement by a wedge 32, sliding on the side of the cylinder underneath the inclined lower edge of said valve-lever and adapted to be automatically drawn in a lateral engaging direction by a spring 33 or other equivalent means, as clearly illustrated in Figs. 13 and 15. In my former patented construction the duty of holding the valve open and the period of its being held open are dependent upon a positive movement of the charger. In the present construction there is a radical difference in action and construction—to wit, that whenever the safety-valve opens it will be automatically held open by mechanical means independent of any operative movement of the press parts. The above-described valve mechanism remains in such open condition until in the upward movement of the parts with the upper mold-plunger the adjustable stop 34 on the press-frame is reached, which on a further upward movement of the parts, as shown in dotted lines in Fig. 15, actuates the bell-crank lever 35, pivoted to a suitable bracket on the cylinder, to force the wedge 32 from under the valve-lever 29 and allow the valve 28 to close, the pendent arm of the bell-crank acting against a stud or projection 36 on the wedge 32, as shown.

By holding the valve open in a positive manner, as above described, during the upward movement of the upper mold-plunger 23 the water that has been previously forced out of the hydraulic cylinder into a suitable receiver is allowed to be drawn back into the same by suction due to the extension of the plunger parts by gravity to their normal condition, and as it is essential that the valve be held away from its seat during such time this may be effected by a small spring interposed to push the valve upward or by connecting the upper end of the valve in a positive manner to the valve-lever, as indicated in dotted lines in Fig. 15.

To limit the independent movement or travel between the aforesaid plunger parts so as to regulate the time in the action of the press at which the final pressure is brought to bear upon the charge of clay in the molds to accord with the thickness of the brick or block to be produced, I provide in connection with the aforesaid plunger parts the following arrangement of parts for confining and regulating the independent motion between the same.

37, Fig. 11, indicates tie or confining bolts passing through lugs on the sides of the hydraulic cylinder and its plunger or head and provided with adjustable nuts or heads at top or bottom or at both ends, by the adjustment of which the space for an independent movement of the parts can be restricted or enlarged to any desired requirement, and the scope of the press is accordingly enlarged, it being a well-known fact in the building trade that bricks are demanded in thickness ranging from one and eleven-sixteenths to five inches. To meet such varying requirements, a variable independent movement between the parts is necessitated in order that the press will be adapted to produce all the various kinds of bricks demanded by the building trade.

The flange or enlargement 38 on the lower end of the upper hydraulic plunger 27 is preferably of a rectangular form, as shown in Figs. 11 and 12, and is provided with side enlargements or bosses through which the confining-bolts 37 pass. The flange or enlargement 38 is also provided with a marginal upwardly-extending rim, so as to form a drip-chamber surrounding the base of the ram or plunger 27 to receive the drip from the ram-cylinder and prevent a dripping of the same down into the molds, such upturned rim being mainly formed by front and back pieces 38' and 38'', detachably secured to the flange or enlargement 38 by screws or otherwise, as illustrated in Figs. 12 and 13, the purpose of such construction being to afford convenient access to the attaching-bolts 39 by the removal of one or both of said pieces 38' and 38'' when it is desired to remove and replace the upper mold-plungers of the press.

The mold-plungers proper, 40, are attached in place by bolts 39, passing through flanges 41 on their bases and through the flange or enlargement 38, and in order to prevent leakage of water down around the bolts 39 the same will pass up through raised bosses 39' on the upper surface of the flange 38 of the plunger and by this means afford a certain desirable depth in the catch-basin to allow the water to accumulate without danger of the same dripping down into the molds.

42 is a pressure-gage in communication with the hydraulic cushion, its hand or pointer 43 being properly insulated and connected to an electric battery, so that as it comes in contact with the adjustable pin 44 it will complete the electric circuit and ring an alarm-bell placed at any desired position in the works. The pin 44 is made adjustable in the concentric series of holes 45 in the face of the gage, so as to give an alarm only when a desired and predetermined pressure is reached in the hydraulic cushion. (See Figs. 5 and 13.)

In the construction illustrated in the drawings (see Fig. 4) the lower mold-plunger 24 is provided at its lower end with a friction-reducing roller 46, that bears upon the short arm of the main lower pressure-lever 19, that imparts the positive upward movement to the said plunger in pressing and discharging the bricks from the mold, the downward movement of the plunger being accomplished by gravity. In the present improvement the parts that actuate the lower mold-plunger 24 in an upward direction are moved out of the way at the proper time to allow such mold-plunger to descend by gravity, in this a stud or tappet 47 on a rotating part of the machine—such as, for instance, the gear-wheel 48—coming in contact with the auxiliary arm 49, keyed or otherwise secured to the trunnion 6 of the main lever 19, and by moving such arm out of its path in an upward direction imparts the required initial movement to the main lever, the remainder of the movement being effected by the weight of the mold-plunger 24, assisted by the overbalance-weight 50 and wire rope or chain connection 51, that passes around overhead sheaves 86 and is connected to the rear or cam end of the lower pressure-lever 19, as illustrated in Figs. 1 and 4. The strain or pull of the weight and rope tend to lift up the cam end of the lever and hold it in the path of its operating-cam 52. With this improved construction the tendency of the weight and chain is to constantly pull up the long arm of the pressure-lever 19 and admit of a free downward tendency of the lower press-plunger and is only prevented from so doing at certain intervals by the action of the pressing and raising cam 52 upon the lever 19.

The amount of the descent of the lower mold-plunger in the mold opening or cavity, and in consequence the amount or quantity of clay that such mold opening or cavity will take from the charger at each operation of the press, is limited and regulated by the following mechanism:

53 is a lever journaled to a frame or standard 54 and passing through an elongated eye of a bar 55, by which the overbalance-weight 50 is connected to its wire-rope or chain connection 51, its movable end having link connection 56 with the pendent end of the vertically-arranged regulating-screw 57, the vertical adjustment of which is effected by a hand-wheel nut 58, as illustrated in Fig. 1. In this construction the position of the lever 53 regulates the position of the over-balance 50 by preventing a further descent of the same, and as the position of such weight 50 regulates the position of the long and overbalanced lever 19, that actuates the lower mold-plunger 24, it follows that the position of the lever 53 will control the amount of downward movement of the mold-plunger 24 and in consequence afford a ready and accurate means for gaging the amount of clay taken by the mold for each pressing of brick. The upper mold-plunger 23 is connected by a link 59 to the shorter arm of the main upper pressure-lever 18, so as to move positively with the same in both directions, both in the operation of pressing the charge of clay in the molds into brick, as well as in moving upward out of the way in the succeeding operations of discharging the made brick from the mold and pushing the same out into the the receiving-table therefor at the front of the press. Said upper mold-plunger has a downward tendency due to its own weight and that of the overbalance-weight 60, having chain or rope connection 61, passing around the overhead sheaves 62 and attached to the rear or cam end of the upper pressure-lever 18, as clearly illustrated in Figs. 1 and 4. The plunger is held in its upper or elevated position against said tendency to descend by means of an auxiliary arm 63, keyed or otherwise secured to the trunnion 5 of the main pressure-lever 18, the free end of which when the upper plunger is in its elevated position, as shown in dotted lines, Fig. 3, is located in the path of and is engaged and depressed by the concentric rim portion 64 of a cam 65, secured to the cam-shaft 66 of the main cam 67, preferably through the instrumentality of the gear-wheel 68, to the side of which it may be secured, as shown, the purpose of this improved construction being to provide positive means for raising the upper mold-plunger 23 at the proper time into its elevated position, hold it at such elevation during the forward and backward movements of the clay-charger, and then allow it to drop suddenly to give the initial pressure or impact to the loose body of clay in the mold to drive out the air contained therein, as the drop of the weight 50 regulates the drop of the lower ram, which in turn governs the amount of clay in the molds. With an ordinary or downward impact of the upper press-plunger it will give a primary movement to the clay in the molds and impart an initial pressure to said clay; but if said impact is still more forcible (which is desirable) it will cause an additional downward movement of the lower press-plunger independent of its chain connections that will cause all the air to escape and allow a subsequent additional upward movement of the partially-compressed clay and lower mold-plunger and tend to produce a stronger and better brick, as under the latter conditions a more efficient compression will take place, owing to the fact that all the elastic features have been eliminated from the contents of the molds. The weight and chain of the upper press-plunger in the present improved construction will only act in imparting a downward movement of the upper press-plunger when the plunger mechanism is released from its retaining-cam 64. Then the pressing-cam 67 acts on the lever of the press-plunger. The chain and weight connections aid in effecting a downward movement of said upper press-plunger, and when the raising-cam 65 acts on the operating-lever, it is compelled to raise the differential weight.

In the construction illustrated in the drawings motion is communicated to the cam-shafts 66 and 69 through sets of gear-wheels 48 and 68 on the ends of said shafts receiving motion from pinions 70 on a counter-shaft 71, that in turn carries a gear-wheel 72, driven by a pinion 73 on the main driving-shaft 74. The pair of gear-wheels 48 and 68 on one side of the press carry the cam-plate 64 65, that by depressing the arm 63 lifts the upper mold-plunger 23, also the tappet 47, that gives the initial downward movement to the lower mold-plunger 24, as before described, as well as the tappet or stud 75 of the stop mechanism hereinafter described for stopping the press after each operation of the same. The pair of gear-wheels 48 and 68 on the opposite side of the press carry the cam-plates that impart the required motion to the reciprocating clay-charger 82 of the press, which receives an intermittent reciprocating motion at proper intervals in the action of the press through links 76 from the bell-crank lever 77, the free end of which is of a forked or triangular shape and provided with friction-reducing rollers 78 and 79, against which the cam-plates 80 and 81 on the aforesaid gear-wheels act to impart an upward and a downward movement, respectively, to the free end or arm of the lever 77 and communicate the necessary forward and backward movement to the clay-charger.

The clay-charger 82 will have the usual rearwardly-extending table or apron 83 for closing the mouth of the clay-chute (not shown) when the charger moves forward to supply the molds with clay, &c., and in the present invention such charger will consist of longitudinal wrought-metal channel-bars or side pieces 84, united together by wrought metal cross-pieces 85 of a channel form, the table portion 83 being of a flanged or channeled form, such parts being bolted or riveted together to form the complete charger, as clearly illustrated in Figs. 18, 19, 20, and 21.

The main driving-shaft 74 is connected to its driving-pulley 87 by means of a friction-clutch 88 of any usual construction, but preferably one in which a rimmed disk is engaged by a set of expanding blocks 89, as illustrated in Figs. 7 and 8, operated by toggle-links connected to a sliding collar 90 on the driving-shaft 74, which collar is operated by a yoke-shaped rock-arm 91 on the rock-shaft 92. In the present invention this rock-shaft 92 extends forward and is provided with a hand-lever 93, by which it can be manipulated by hand to throw the clutch, and with it the operative parts of the press, into and out of gear, and also with an arm 94, projecting into the path of the stud or tappet 75 on a rotating part of the press, preferably the gear-wheel 48, as heretofore described, so that at each rotation of the cam-shaft carrying said gear the rock-shaft 92 will be operated automatically to throw the moving parts of the press out of gear and cause the same to stop. By this means the constant attention of the operator can be required to keep up the action of the machine and observe its operation.

By removing the stud or tappet 75 from its socket in the gear-wheel 48 the action of the press is rendered continuous, and it is within the province of the present invention to make such stud or tappet concentrically adjustable on the gear-wheel 48 by any usual means, so as to automatically stop the press at any desired point in its operation.

The mold 3 is of the usual rectangular form and fits in recesses in the inner faces of the main housings formed by the cheeks or lugs on the same, as shown in Fig. 13, and held in place against longitudinal displacement by the transverse tie or frame pieces 95 96, bolted to the front and rear of the housings, as shown in Figs. 1, 2, 3, 4, and 6, and which may form part of the brick-receiving table at the front of the mold and the stationary charger-table at the rear of the same, respectively. The outer inclosing frame of the mold is formed of rectangular bars of metal 97 97 98 98, butted together, as shown in Fig. 22, the longer transversely-extending bars or members 97 97 being formed with transversely-extending holes or passages for the main transverse bolts 99 99, that tie the mold parts and the housings together against the tendency of the parts to spread open laterally under the strain to which they are exposed in the brick-pressing operation. Such transverse bars or members 97 97 are the full width of the mold-frame and lap past the shorter longitudinal end members or bars 98, so that their ends will enter and be supported by the mold-receiving recesses in the inner faces of the main housings. The inner frame or mold proper is of a similar sectional formation and is composed of two long transverse pieces 100 100 and the shorter end and intermediate partition-pieces 101 102, attached together in a firm and substantial manner by the following improved construction: On each end of the longitudinal pieces or bars 101 and 102 are formed a pair of square projections 103, adapted to enter and fit a pair of similarly-formed apertures 104 in the long transverse bars 100. These projections and the apertures therefor are of a less depth than the thickness of the transverse bars 100, and they end respectively in screw-threaded shanks 105 and cylindrical orifices 106 for the reception of the enlarged cylindrical base of the nuts 107, that screw onto the screw-threaded shanks 105. In the construction shown the shanks 105 are provided with extensions 108, screw-threaded on their ends 109 to receive the nuts 110, that secure the transverse bars 97 of the outer mold-frame in place, the proper position of such bars being insured and displacement in use prevented by the series of cylindrical orifices 111 in their inner faces fitting onto the cylindrical bases of the nuts 107, as clearly illustrated in Fig. 26. The end pieces 101 of the mold proper are attached to the end pieces 98 of the mold-frame by a rabbeted or tongue-and-grooved connection 112, as illustrated in Figs. 13 and 26. The inner faces of the mold-pieces proper, that constitute the walls of the mold-cavity, are provided with the usual removable wear-plates or liners 113, fitted in place by a dovetail or other usual mode of attachment, as illustrated in Figs. 23, 24, and 25.

With the above-described sectional formation of the mold the outer dimensions of the outer sectional mold-frame 97 98 always remain constant to fit the mold-receiving cavity in the main frame of the press, so that such sectional members 97 98 act simply as filling-pieces between the mold proper, 101 101, and the press-housings, their sectional formation admitting of ready removal and replacement by substitute parts of the required thickness to suit a particular change in size or proportion of the mold proper. By such arrangement a cheap and durable construction is provided, in that repairs and replacements to suit different classes of work can be readily effected, and by the rectangular or bar formation of the different parts the making and finishing of the same from wrought metal can be readily and cheaply accomplished.

The general operation of my improved press is as follows: Assume the clay-charger 82 to have carried forward a supply of clay, filling the mold 3, and then moved backward out of the way, such movement of the charger being effected in a forward direction by the cam-plate 80, carried by the upper gear-wheel 68, acting against the bell-crank lever 77 to impart a forward movement to the charger, and in a backward direction by the cam-plate 81 on the lower gear-wheel 48 acting against the aforesaid bell-crank lever to lift the same and draw the charger backward through lever 77 and connecting-link 76. The backward movement of the charger is consecutive to its forward movement, after which it remains at rest during the succeeding movements of the press in compressing the charge of clay into bricks, &c. As the charger reaches its backward position the cam-plate 64 65 on the gear-wheel 68, which had previously held the upper plunger 23 in its elevated position by its concentric face 64 engaging over the auxiliary arm 63 of the main pressure-lever 18, now releases said auxiliary arm and allows the plunger to drop onto the loose clay in the mold with some force to expel a portion of the air out of the clay, at the same time producing a partial compression of the same. Immediately succeeding the descent of the upper mold-plunger, as above described, the lower mold-plunger 24 commences to ascend through the instrumentality of the main lower pressure-lever 19 and its operating-cam 52, lifting the body of clay upward against the dead-weight of the upper plunger and its connecting parts, and thus imparting ample pressure upon the clay to expel the air therefrom in a thorough manner. Before the clay reaches the top of the mold the upper plunger 23 is caused to positively descend, through its pressure-lever 18 and operating-cam 67, to impart the final compression to the clay. Such upper plunger, as in my former patent, No. 340,049, exerts the main or effective pressure in compressing the charge of clay into bricks and under ordinary conditions will make a full downward stroke at each operation of the press, the hydraulic relief or safety device coming into action only when a drier clay or a clay containing more sand is fed to the molds. When such conditions arise before the upper plunger completes its full downward stroke, a maximum pressure is exerted, and the relief devices come into action to prevent a breakage of the press parts in their continued movement and still attain the desired and effective pressure upon the charge of clay. The relative time at which the finishing pressure by the upper mold-plunger on the charge of clay commences and the consequent vertical position at which it takes place in the mold can be positively regulated by the adjustment of the independent movement-limiting devices 37 37 for the upper-plunger parts, as heretofore described. By such control of the vertical position in which the mold contents are compressed the scope of the press is extended to make brick or blocks of a desired thickness without any change other than that required in adjusting the stop-nuts on the tie-rods 37 and the gaging mechanism 53, 57, 58, &c., for regulating the amount of clay taken by the molds. After exerting the required pressure upon the charge of clay the upper plunger is released from its operating-cam 67, and the cam-plate 64 65 engages the auxiliary arm 63 to lift the upper mold-plunger from off the bricks and hold it in its elevated position. In the meantime the continued positive upward tendency of the lower mold-plunger lifts the bricks out of the mold until the face of the lower plunger 24 comes to a level with the top of the mold, when in ordinary cases the press will come to a stop by the tappet or stud 75 coming in contact with the arm 94 of the rock-shaft 92 to release the friction-clutch on the main driving-shaft of the press and requiring that the friction-clutch be reëngaged by hand before the press mechanism will again start. The action of the press may, however, be made continuous, as before described, by removing said tappet or stud 75 from its socket in the gear-wheel 48. Immediately succeeding the lifting of the bricks from the mold by the lower plunger 24 the charge is caused to move forward by its operating cam-plate 80 and lever and link 77 and 76, and in its forward movement pushes the made bricks forward onto a receiving-table at the front of the press and at the same time brings a fresh charge of clay over the molds. As the charger completes its forward movement the lower mold-plunger 24 is released by its cam and drops down to its lower position to admit of the mold filling with clay. The charger is then moved backward by its operating-cam 81 and lever-and-link connections 77 and 76, and the different movements and operations above enumerated repeat themselves in consecutive order.

Having thus fully described my said invention, what I claim as new, and desire to secure by Letters Patent, is—

1. In a brick-press, the combination of a brick-mold, a two-part mold-plunger, a hydraulic chamber connecting the plunger parts, a connection or passage connecting the hydraulic chamber to the overflow-chamber, a valve arranged in said passage, a weighting device in connection with which said valve becomes a safety-valve, and a detaining device by means of which said valve may be deprived of the influence of said weighting device and become an inflow and outflow valve.

2. In a brick-press, the combination of a brick-mold, a two-part mold-plunger, a hydraulic chamber connecting the plunger parts a valve connected to said chamber, said valve acting normally as a safety-valve, and means for converting said valve into an inlet-valve, substantially as set forth.

3. In a brick-press, the combination of a brick-mold, a two-part mold-plunger, a hydraulic chamber connecting the plunger parts a valve connected to said chamber, said valve acting normally as a safety-valve, and means for converting said valve into an inlet and means for converting said valve into an outlet valve, substantially as set forth.

4. A two-part mold-plunger for brick-presses, connected together by a hydraulic cushion, and means for restricting independent movement between the parts, the same consisting of tie-bolts, and adjustable nuts, substantially as set forth.

5. In a brick-press the combination of the two-part mold-plunger, an interposed hydraulic cushion, a safety-valve, and pressure-lever, means for securing the valve and lever in an open condition, and an adjustable stop for releasing the mechanism, substantially as set forth.

6. In a brick-press, the combination of the two-part mold-plunger, an interposed hydraulic cushion, a spring safety-valve and lever, a sliding wedge under the lever, a bell-crank lever connected to the sliding wedge, and a stop on the main frame to actuate the wedge through said bell-crank lever, substantially as set forth.

7. In a brick-press, the combination of the upper hydraulic plunger, the main body of which constitutes the plunger of a hydraulic cylinder, and is provided with marginal flange on its lower end having upwardly-extending bosses, and an upwardly-extending marginal rim, with the mold-plungers 40, and attaching-bolts 39 passing up through the bosses 39', substantially as set forth.

8. In a brick-press, the combination of an upper hydraulic plunger, the main body of which constitutes the plunger of a hydraulic cylinder, and is provided with marginal flange on its lower end having upwardly-extending bosses, and an upwardly-extending marginal rim, mainly formed by the detachable pieces 38', 38", with the mold-plunger 40, and attaching-bolts 39 passing up through the bosses 39', substantially as set forth.

9. In a brick-press the combination of the upper mold-plunger and its operating-lever, having an auxiliary arm 63, with a cam or tappet 64, 65, arranged on a rotating part of the press mechanism and adapted to retain said plunger in a raised condition, and at the proper time allow it to drop with force upon the charge of clay, substantially as set forth.

10. In a brick-press the combination of the lower mold-plunger, and its operating-lever, having an auxiliary arm 49, with a tappet 47, arranged on a moving part of the press mechanism, and adapted to impart initial reverse movement to the operating-lever 19, substantially as set forth.

11. In a brick-press, the combination of the upper mold-plunger, an operating cam and lever, the short arm of which has connection with the mold-plunger and the long arm with the cam, a weight 60, and an overhead chain or rope connection 61, to aid in imparting downward movement to the upper mold-plunger, substantially as set forth.

12. In a brick-press, the combination of the lower mold-plunger, an operating cam and lever, the short arm of which has connection with the mold-plunger, and the long arm with the cam, a weight 50, and an overhead chain or rope connection 51, to aid in lifting the long arm of the plunger-operating lever, substantially as set forth.

13. In a brick-press, the combination of the lower mold-plunger, an operating cam and lever, the short arm of which has connection with the mold-plunger and the long arm with the cam, a weight 50, an overhead chain or rope connection 51, and means for regulating the downward movement of said weight, substantially as set forth.

14. In a brick-press, the combination of the lower mold-plunger, and its operating-lever, with a weight 50, chain or rope connection 51, adjustable lever 53, adjusting-screw 57, adjusting-wheel 58, and housing 54, substantially as set forth.

15. In a brick-press, the combination of the reciprocating clay-charger, its link 76, and bell-crank lever 77, having a forked or triangular end, with the operating-cam 80 and 81, on a rotating part of the press, substantially as set forth.

16. The combination in a brick-press of the main driving-shaft 74, connected to its driving-pulley by a friction-clutch, with the clutch-operating rock-shaft 92, the rock-arm 94, and a stud or tappet 75, on a moving part of the press, substantially as set forth.

17. In a brick-press, the combination of the main driving-shaft 74, connected to its driving-pulley by friction-clutch, a clutch-operating rock-shaft 92, rock-arm 94, stud or tappet 75 on a moving part of the press, adapted to automatically stop the press mechanism, and the hand-lever 93 on the rock-shaft 92, to afford means for restarting the press mechanism, essentially as herein described.

18. In a brick-press, the combination of the inner detachable sectional mold-frame, and the outer inclosing sectional frame therefor, consisting of pieces 97 and 98, the press-housing formed with recesses to receive the same, and tie-bolts 99 passing through the press-housing and through the pieces 97 to securely tie the parts together, substantially as set forth.

19. In a sectional mold for brick-presses, the inner and outer mold-frames, held against lateral displacement, with relation to each other by the cylindrical base of the nut 107, fitting into cylindrical recesses in the adjacent faces of the mold parts 97, 100, substantially as set forth.

20. In a sectional mold for brick-presses, the combination, of the outer sectional frame 97, 98, and the inner frame 100, 101, connected together by projections 103, recesses 104, and nuts 107, having cylindrical bases, adapted to fit cylindrical recesses in the adjacent faces of the parts 97, 100, and arranged to screw onto the shanks 105, extending from the projections 103, substantially as set forth.

21. In a sectional mold for brick-presses, the combination of the outer sectional frame 97, 98, and the inner frame 100, 101, connected together by projections 103, recesses 104, and nuts 107, having cylindrical bases adapted to fit cylindrical recesses in the adjacent faces of the parts 97, 100, and arranged to screw onto the shanks 105, extending from the projections 103, and outer nuts 110, confining bars 97, in place, substantially as set forth.

22. In a brick-press, the combination of the inner sectional mold-frame, the outer inclosing sectional frame therefor, consisting of the pieces 97 and 98, the press-housing formed with recesses to receive the same, and the front and rear tie-plates 95 and 96, secured to the press-housing to tie the press and mold parts together laterally, substantially as set forth.

In testimony whereof I affix my signature in presence of two witnesses.

JULIUS J. KOCH.

Witnesses:
ROBERT BURNS,
GEO. H. ARTHUR.